United States Patent
Abramson et al.

(10) Patent No.: US 8,259,920 B2
(45) Date of Patent: Sep. 4, 2012

(54) CALL EXTENSION IN TELECOMMUNICATIONS SYSTEMS

(75) Inventors: Sandra R. Abramson, Freehold, NJ (US); Stephen M. Milton, Freehold, NJ (US); Emil F. Stefanacci, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1562 days.

(21) Appl. No.: 11/042,794

(22) Filed: Jan. 25, 2005

(65) Prior Publication Data

US 2006/0177032 A1    Aug. 10, 2006

(51) Int. Cl.
*H04M 3/42* (2006.01)

(52) U.S. Cl. ........... 379/212.01; 379/88.21; 379/207.01; 379/211.02; 455/519

(58) Field of Classification Search .... 379/88.19–88.22, 379/207.1–215.01; 455/519
See application file for complete search history.

(56) References Cited

U.S. PATENT DOCUMENTS

| | | | |
|---|---|---|---|
| 5,590,186 A * | 12/1996 | Liao et al. | 379/211.02 |
| 5,815,562 A * | 9/1998 | Iglehart et al. | 379/211.04 |
| 5,867,562 A * | 2/1999 | Scherer | 379/88.21 |
| 6,175,619 B1 | 1/2001 | DeSimone | |
| 6,178,237 B1 | 1/2001 | Horn | |
| 6,243,454 B1 | 6/2001 | Eslambolchi | |
| 6,853,718 B1 * | 2/2005 | Bedingfield et al. | 379/212.01 |
| 6,996,217 B2 * | 2/2006 | Goldman | 379/142.01 |
| 7,106,848 B1 * | 9/2006 | Barlow et al. | 379/212.01 |
| 7,228,145 B2 * | 6/2007 | Burritt et al. | 455/519 |
| 2005/0286699 A1 * | 12/2005 | Gagle | 379/202.01 |
| 2006/0043164 A1 * | 3/2006 | Dowling et al. | 235/375 |

* cited by examiner

*Primary Examiner* — Yuwen Pan
*Assistant Examiner* — Ibraham Sharifzada
(74) *Attorney, Agent, or Firm* — Maldjian Law Group LLC; John P. Maldjian, Esq.; Alexander D. Walter, Esq.

(57) ABSTRACT

A method is disclosed that enables a user of one telecommunications terminal that is engaged in a call to move or "extend" the call to a second telecommunications terminal without notifying any other party on the call of the move. This is particularly useful in many situations. For example, the user might be at work and engaged in a call with a client on the user's wireline desk telephone. If the user needs to leave the office, the user can extend the call to his or her cell phone, while the call is in progress, without notifying the client. This enables the user to leave the office and continue the call on his or her cell phone without having the client ever know that the user is on his or her cell phone and not in the office.

15 Claims, 3 Drawing Sheets

CALL EXTENSION IN TELECOMMUNICATIONS SYSTEMS

FIELD OF THE INVENTION

The present invention relates to telecommunications in general, and, more particularly, to a telecommunications system feature.

BACKGROUND OF THE INVENTION

The utility of a telecommunications system is enhanced by the invention and development of new and useful features that increase the efficiency and effectiveness of the system's users. Therefore, the need exists for such features.

SUMMARY OF THE INVENTION

The present invention enables a user of one telecommunications terminal that is engaged in a call to move or "extend" the call to a second telecommunications terminal without notifying any other party on the call of the move. This is particularly useful in many situations.

For example, the user might be at work and engaged in a call with a client on the user's wireline desk telephone. If the user needs to leave the office, the user can extend the call to his or her cell phone, while the call is in progress, without notifying the client. This enables the user to leave the office and continue the call on his or her cell phone without having the client ever know that the user is on his or her cell phone and not in the office.

Analogously, the user might be in the car and engaged in a call with a client on the user's cell phone. When the user arrives in his or her office, the user can extend the call to his or her wireline desk telephone, while the call is in progress, without notifying the client. This enables the user to arrive at the office and continue the call on his or her wireline desk telephone without the client ever knowing that the client was not always in the office.

In this example, both the user's wireline desk telephone and the user's cell phone are "affiliated" with each other, which enables the telecommunications system to extend calls back and forth between the desk telephone and the cell phone. Furthermore, either the desk telephone or the cell phone is designated as the facade of the other so that the telephone number of the facade is used as the automatic number identification ("ANI") or "Caller-ID" for both the desk telephone and the cell phone.

The illustrative embodiment comprises: (1) setting up a call between a first telecommunications terminal and a second telecommunications terminal; (2) adding a third telecommunications terminal to the call without transmitting any indication to the second telecommunications terminal that the third telecommunications terminal is being added to the call; and (3) dropping the first telecommunications terminal from the call without transmitting any indication to the second telecommunications terminal that the first telecommunications terminal is being dropped from the call.

DETAILED DESCRIPTION

Figure 1:
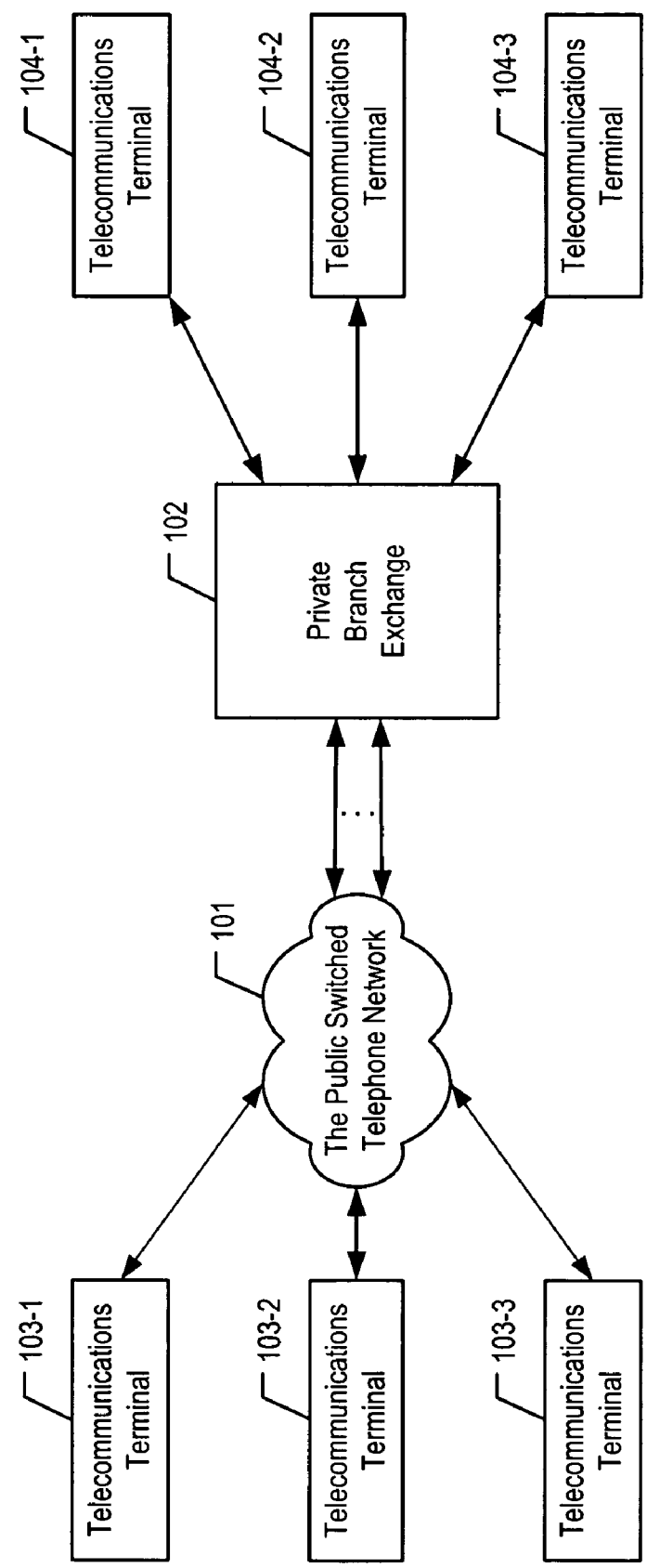
FIG. 1 depicts a schematic diagram of a telecommunications system in accordance with the present invention.

FIG. 1 depicts a schematic diagram of a telecommunications system in accordance with the present invention. Telecommunications system 100 comprises:
  i. the Public Switched Telephone Network,
  ii. private branch exchange 102,
  iii. telecommunications terminals 103-1, 103-2, and 103-3, and
  v. telecommunications terminals 104-1, 104-2, and 104-3;
all of which are interconnected as shown.

The Public Switched Telephone Network is a complex of telecommunications equipment that is owned and operated by different entities throughout the World. In the United States of America, for example, the Public Switched Telephone Network comprises an address space that is defined by ten digits, and, therefore, comprises 10 billion unique addresses or "telephone numbers." The Public Switched Telephone Network in other countries is similar. In any case, it will be clear to those skilled in the art how to make and use embodiments of the present invention that interact with, or are a part of, the Public Switched Telephone Network.

The Public Switched Telephone Network provides telecommunications service to telecommunications terminals 103-1, 103-2, and 103-3 in well-known fashion. Telecommunications terminals 103-1 and 103-3 are wireline terminals and telecommunications terminal 103-2 is a wireless terminal. Table 1 provides the telephone numbers for telecommunications terminals 103-1, 103-2, and 103-3.

TABLE 1

Telephone Numbers of Telecommunications Terminals Served By The Public Switched Telephone Number

| Telecommunications Terminal | Telephone Number |
| --- | --- |
| 103-1 | 732-454-3234 |
| 103-2 | 435-345-8932 |
| 103-3 | 752-953-5822 |

It will be clear to those skilled in the art, after reading this specification, how to make and use alternative embodiments of the present invention in which some or all of the telecommunications terminals are wireline or some or all are wireless.

Private branch exchange 102 provides telecommunications service to telecommunications terminals 104-1, 104-2, and 104-3. In accordance with the illustrative embodiment, telecommunications terminals 104-1, 104-2, and 104-3 are wireline terminals. It will be clear to those skilled in the art, after reading this specification, how to make and use alternative embodiments of the present invention in which private branch exchange 102 provides telecommunications service to any number of telecommunications terminals. Furthermore, it will be clear to those skilled in the art, after reading this specification, how to make and use alternative embodiments of the present invention in which some or all of the telecommunications terminals are wireline and some or all are wireless.

Private branch exchange 102 comprises an address space that is different from the address space of the Public Switched Telephone Number, and each of telecommunications terminals 104-1, 104-2, and 104-3 is uniquely associated with an address or "extension" in the address space of private branch exchange 102. Table 2 provides the exchange number for telecommunications terminals 104-1, 104-2, and 104-3.

TABLE 2

Exchange Numbers of Telecommunications Terminals Served By Private Branch Exchange 102

| Telecommunications Terminal | Exchange Number |
|---|---|
| 104-1 | x22 |
| 104-2 | X64 |
| 104-3 | X72 |

Private branch exchange 102 has a telephone number within the address space of the Public Switched Telephone Network, which is 732-555-2322.

Although the illustrative embodiment teaches that a private branch exchange performs the tasks described below and with respect to FIG. 3, it will be clear to those skilled in the art, after reading is disclosure, how to make and use alternative embodiments of the present invention in which, for example, the tasks are performed by a switch within the Public Switched Telephone Network. In other words, the present invention is equally well-suited for implementation in public and private telecommunications systems and in wireline and wireless systems as well.

Figure 2:
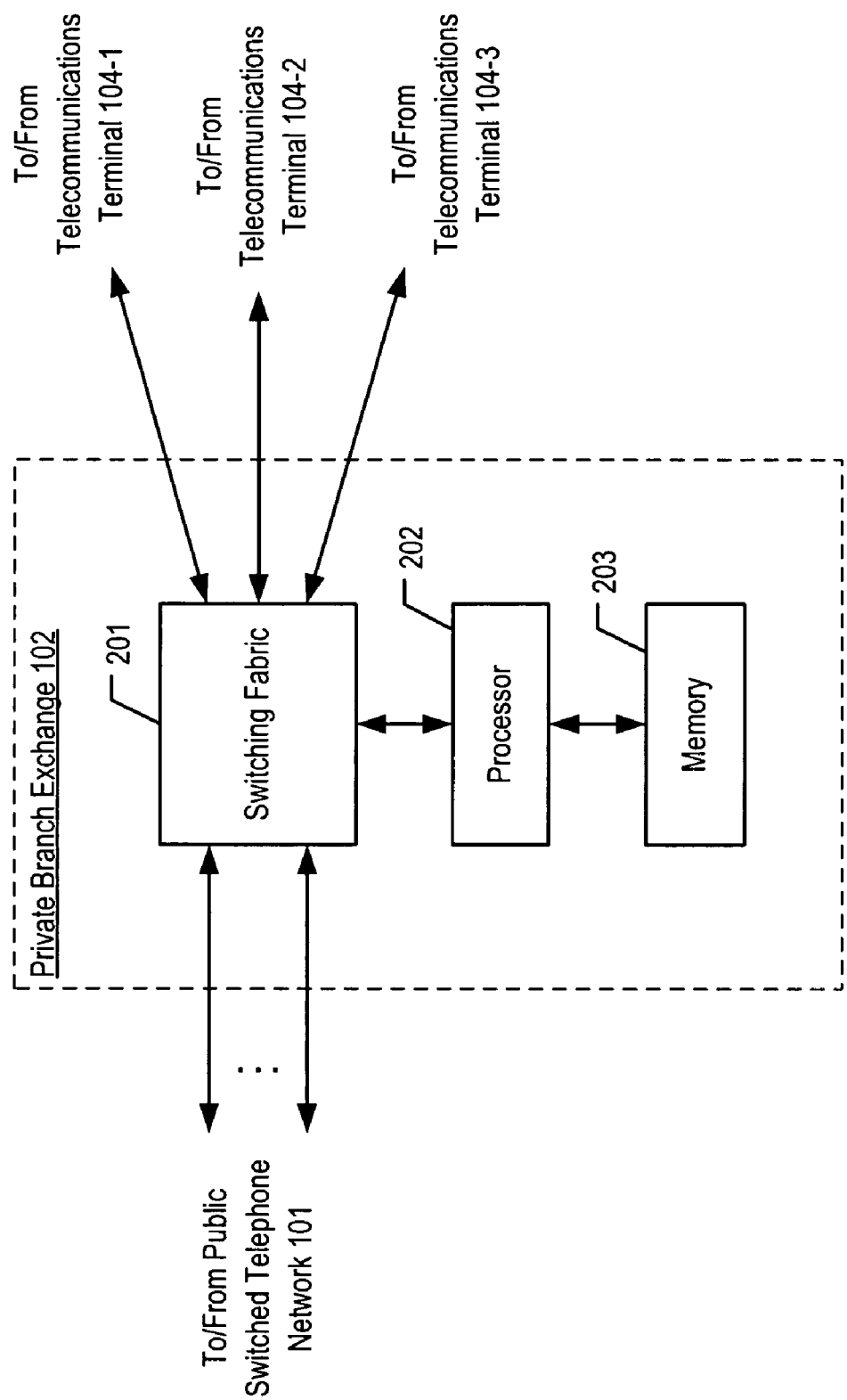
FIG. 2 depicts a block diagram of the salient components of private branch exchange 102 in accordance with the illustrative embodiment of the present invention.

FIG. 2 depicts a block diagram of the salient components of private branch exchange 102 in accordance with the illustrative embodiment of the present invention. Private branch exchange 102 comprises: switching fabric 201, processor 202, and memory 203, interconnected as shown.

Switching fabric 201 is capable of performing all of the tasks described below and with respect to FIG. 3 under the direction of processor 202. It will be clear to those skilled in the art, after reading this disclosure, how to make and use switching fabric 201.

Processor 202 is a general-purpose processor that is capable of receiving called-related data from switching fabric 201, of reading data from and writing data to memory 203, and of executing the tasks described below and with respect to FIG. 3. It will be clear to those skilled in the art, after reading this specification, how to make and use alternative embodiments of the present invention in which processor 202 is a special-purpose processor.

Memory 203 is a non-volatile random-access memory that stores the instructions and data used by processor 202. It will be clear to those skilled in the art, after reading this disclosure, how to make and use memory 203.

In accordance with the illustrative embodiment of the present invention, telecommunications terminal 103-3 and telecommunications terminal 104-1 are "affiliated" with each other within private branch exchange 102, and memory 203 comprises a memorial of this affiliation. The memorial is depicted by Table 3.

TABLE 3

Affiliated Telecommunications Terminals

| Telecommunications Terminal | Telecommunications Terminal |
|---|---|
| 103-2 | 104-2 |

When a telecommunications terminal served by the Public Switched Telephone Network is affiliated with a telecommunications terminal that is served by public branch exchange 102, private branch exchange 102 enables the telecommunications terminal served by the Public Switched Telephone Network to be treated as an alter ego of the telecommunications terminal that is served by public branch exchange 102 in the manner described below and with respect to FIG. 3.

Figure 3:
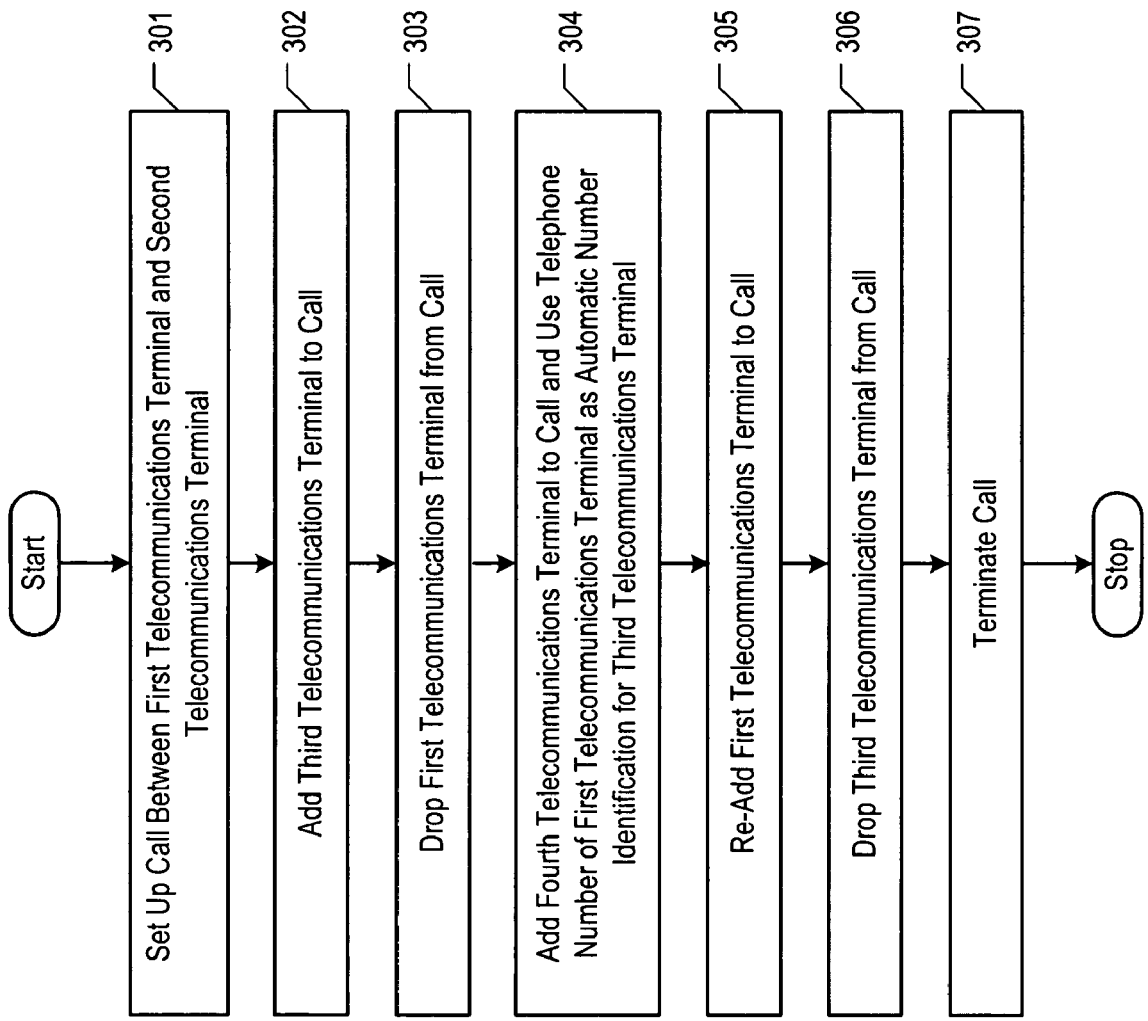
FIG. 3 depicts a flowchart of the salient tasks associated with operation of the illustrative embodiment of the present invention.

FIG. 3 depicts a flowchart of the salient tasks associated with operation of the illustrative embodiment of the present invention.

At task 301, private branch exchange 102 sets up a call between telecommunications terminal 103-1 and telecommunications terminal 104-2, in well-known fashion. It is irrelevant for the purposes of the illustrative embodiment whether the call was initiated by telecommunications terminal 103-1 or telecommunications terminal 104-2.

At task 302, the user of telecommunications terminal 104-2 instructs private branch exchange 102 to extend the call to telecommunications terminal 103-2, which as shown in Table 3 in memory 203 is affiliated with telecommunications terminal 104-2. To accomplish this, private branch exchange 102 adds telecommunications terminal 103-2 to the call:

i. without transmitting any indication to telecommunications terminal 103-1 that telecommunications terminal 103-2 is being added to the call, and ii. before telecommunications terminal 103-2 goes off hook (i.e., answers the call from private branch exchange 102.

Task 302 is similar to conferencing-in telecommunications terminal 103-2 with the notable exception that private branch exchange 102 does not provide ring-back to telecommunications terminal 103-1 while telecommunications terminal 103-2 is being added to the call.

At task 303, the user of telecommunications terminal 103-2 answers the call from private branch exchange 102 by going off hook, which causes private branch exchange 102 to drop telecommunications terminal 104-2 from the call. In accordance with the illustrative embodiment, private branch exchange 102 drops telecommunications terminal 104-2 from the call without transmitting any indication to telecommunications terminal 103-1 that telecommunications terminal 104-2 is being dropped from the call.

At task 304, the user of telecommunications terminal 103-2 instructs private branch exchange 102 to create a three-party conference call from the existing two-party call by adding telecommunications terminal 103-3 to the call. As part of task 304, private branch exchange 102 places a call to telecommunications terminal 103-3 and uses the telephone number of telecommunications terminal 104-2 as the automatic number identification for telecommunications terminal 103-2. In other words, private branch exchange 102 spoofs telecommunications terminal 103-3 by representing that the call is being established with telecommunications terminal 103-1 and telecommunications terminal 104-2 when, in fact, it is being established with telecommunications terminal 103-1 and telecommunications terminal 103-2.

At task 305, the user of telecommunications terminal 103-2 instructs private branch exchange 102 to extend the call to telecommunications terminal 104-2. To accomplish this, private branch exchange 102 adds telecommunications terminal 104-2 to the call:

i. without transmitting any indication to telecommunications terminal 103-1 or telecommunications terminal 103-3 that telecommunications terminal 104-2 is being added to the call, and ii. before telecommunications terminal 104-2 goes off hook (i.e., answers the call from private branch exchange 102.

Task 305 is analogous to task 302.

At task 306, the user of telecommunications terminal 104-2 answers the call from private branch exchange 102 by going off hook, which causes private branch exchange 102 to drop telecommunications terminal 103-2 from the call. In accordance with the illustrative embodiment, private branch exchange 102 drops telecommunications terminal 103-2 from the call without transmitting any indication to either telecommunications terminal 103-1 or telecommunications terminal 103-3 that telecommunications terminal 103-2 is being dropped from the call.

At task 307, private branch exchange 102 terminates the call between all parties in well-known fashion.

It is to be understood that the above-described embodiment is merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   establishing, by a private branch exchange, a call between a first telecommunications terminal and a second telecommunications terminal;
   adding, by the private branch exchange, a third telecommunications terminal to the call while the call is in progress, wherein the private branch exchange:
   i. comprises an affiliation between the first telecommunications terminal and the third telecommunications terminal, and
   ii. adds the third telecommunications terminal to the call without transmitting any indication to the second telecommunications terminal that the third telecommunications terminal is being added to the call; and
   dropping, by the private branch exchange, the first telecommunications terminal from the call when the third telecommunications terminal goes off-hook;
   wherein the affiliation designates one of the first telecommunications terminal and the third telecommunications terminal to be a façade for both the first telecommunications terminal and the third telecommunications terminal, and wherein the private branch exchange is to represent either the first telecommunications terminal or the third telecommunications terminal using the telephone number of the façade,
   wherein the façade comprises an automatic number identification or caller-ID of one telecommunications terminal when the automatic number identification or caller-ID of the one telecommunications terminal is used by another telecommunications terminal.

2. The method of claim 1 wherein the private branch exchange drops the first telecommunications terminal from the call without transmitting any indication to the second telecommunications terminal that the first telecommunications terminal is being dropped from the call.

3. The method of claim 1 wherein:
   i. the first telecommunications terminal is a wireless telecommunications terminal in a first address space, and
   ii. the third telecommunications terminal is a wireline telecommunications terminal in a second address space that is different from the first address space.

4. The method of claim 1 wherein:
   i. the private branch exchange and the first telecommunications terminal are in a first address space, and
   ii. the second telecommunications terminal and the third telecommunications terminal are in a second address space that is different from the first address space.

5. The method of claim 1 further comprising:
   adding, by the private branch exchange, a fourth telecommunications terminal to the call while the call between the second telecommunications terminal and the third telecommunications terminals is in-progress; and
   transmitting, by the private branch exchange to the fourth telecommunications terminal, the telephone number of the first telecommunications terminal to represent the third telecommunications terminal according to the façade designation in the affiliation.

6. The method of claim 1 further comprising:
   re-adding, by the private branch exchange, the first telecommunications terminal to the call while the call is in-progress, wherein the private branch exchange:
   i. adds the first telecommunications terminal to the call based on the affiliation, and
   ii. adds the first telecommunications terminal to the call without transmitting any indication to the second telecommunications terminal that the first telecommunications terminal is being re-added to the call.

7. The method of claim 6 further comprising:
   dropping, by the private branch exchange, the third telecommunications terminal from the call when the first telecommunications terminal goes off-hook, wherein the third telecommunications terminal is dropped from the call without transmitting any indication to the second telecommunications terminal that the third telecommunications terminal is being dropped from the call.

8. The method of claim 1 wherein the affiliation designates the first telecommunications terminal as the façade, and the first telecommunications terminal is uniquely associated with an address in the address space of the private branch exchange.

9. The method of claim 1 wherein the affiliation designates the first telecommunications terminal as the façade, and the first telecommunications terminal is uniquely associated with an address in an address space that is different than the address space of the private branch exchange.

10. A method comprising:
    establishing, by a private branch exchange, a two-party call between a first telecommunications terminal and a second telecommunications terminal;
    adding, by the private branch exchange while the two-party call is in progress, a third telecommunications terminal, wherein the private branch exchange:
    i. comprises an affiliation between the first telecommunications terminal and the third telecommunications terminal, and
    ii. adds the third telecommunications terminal to the two-party call without transmitting any indication to the second telecommunications terminal that the third telecommunications terminal is being added;
    dropping, by the private branch exchange, the first telecommunications terminal from the two-party call when the third telecommunications terminal goes off-hook , wherein the two-party call continues between the second telecommunications terminal and the third telecommunications terminal;
    establishing, by the private branch exchange, a three-party call from the two-party call by adding a fourth telecommunications terminal; and
    transmitting, by the private branch exchange to the fourth telecommunications terminal, the telephone number of the first telecommunications terminal to represent the third telecommunications terminal according to the affiliation;

wherein the affiliation designates one of the first telecommunications terminal and the third telecommunications terminal to be a façade for both the first telecommunications terminal and the third telecommunications terminal, and wherein the private branch exchange is to represent either the first telecommunications terminal or the third telecommunications terminal using the telephone number of the façade, wherein the façade comprises an automatic number identification or caller-ID of one telecommunications terminal when the automatic number identification or caller-ID of the one telecommunications terminal is used by another telecommunications terminal.

11. The method of claim 10 wherein the private branch exchange drops the first telecommunications terminal from the two-party call without transmitting any indication to the second telecommunications terminal that the first telecommunications terminal is being dropped.

12. The method of claim 10 further comprising:
re-adding, by the private branch exchange while the three-party call is in progress, the first telecommunications terminal, wherein the private branch exchange:

i. adds the first telecommunications terminal to the third-party call based on the affiliation, and ii. adds the first telecommunications terminal to the third-party call without transmitting any indication to the second telecommunications terminal that the first telecommunications terminal is being re-added.

13. The method of claim 12 further comprising:
dropping, by the private branch exchange while the three-party call is in progress, the third telecommunications terminal when the first telecommunications terminal goes off-hook, wherein the third telecommunications terminal is dropped from the three-party call without transmitting any indication to the second telecommunications terminal that the third telecommunications terminal is being dropped.

14. The method of claim 10 wherein:
i. the first telecommunications terminal is a wireless telecommunications terminal in a first address space, and ii. the third telecommunications terminal is a wireline telecommunications terminal in a second address space that is different from the first address space.

15. The method of claim 10 wherein at least one of the first telecommunications terminal and the third telecommunications terminal is uniquely associated with an address in the address space of the private branch exchange.

* * * * *